United States Patent [19]

Davis et al.

[11] Patent Number: 4,620,024
[45] Date of Patent: Oct. 28, 1986

[54] PROCESS FOR PRODUCING AND RECOVERING TRIBUTYL PHOSPHATE ESTERS

[75] Inventors: Robert I. Davis, Pennington, N.J.; Thomas G. Seador, Tonawanda, N.Y.

[73] Assignee: FMC Corporation, Philadelphia, Pa.

[21] Appl. No.: 663,275

[22] Filed: Oct. 22, 1984

Related U.S. Application Data

[63] Continuation-in-part of Ser. No. 491,625, May 5, 1983, abandoned.

[51] Int. Cl.$^4$ .............................. B01D 3/06; C07F 9/02
[52] U.S. Cl. ...................................... 558/113; 558/146; 203/43; 203/74; 203/75; 203/88; 203/DIG. 6
[58] Field of Search .............................. 203/71, 73–75, 203/80–82, 88, 43, DIG. 6, 14; 260/990, 974, 975; 568/913; 558/113, 146

[56] References Cited

U.S. PATENT DOCUMENTS 3,020,303  2/1962  Pianfetti et al. .
3,200,048  8/1965  Briggeman et al. ............. 260/990 X
3,219,547  11/1965  Wheeler ........................... 260/990 X
3,801,683  4/1974  Kodama et al. .
3,945,891  3/1976  Aal et al. ............................. 260/990
4,421,695  12/1983  Parsons et al. ...................... 260/974

Primary Examiner—Wilbur Bascomb
Attorney, Agent, or Firm—Charles C. Fellows; Eugene G. Seems

[57] ABSTRACT

In a continuous alkoxidation-phosphorylation process for producing tributyl phosphate having low color utilizing excess butanol in the alkoxidation reaction which is heated by an alcohol flasher wherein the excess butanol is recovered after phosphorylation by two stage flash distillation, the bottoms product from the first stage going to the second stage, the overhead product from the second stage returning to the first stage flash distillation, and the bottoms from the second stage distillation going to final product washing and drying process while the overhead from the first stage flash distillation is fed to the process alkoxidation alcohol flasher, the improvement which comprises distilling in a distillation column the overhead product from the first stage flash distillation and then feeding the overhead from the distillation column to the alkoxidation alcohol flasher.

3 Claims, 2 Drawing Figures

ALKYL PHOSPHATE ESTER PROCESS

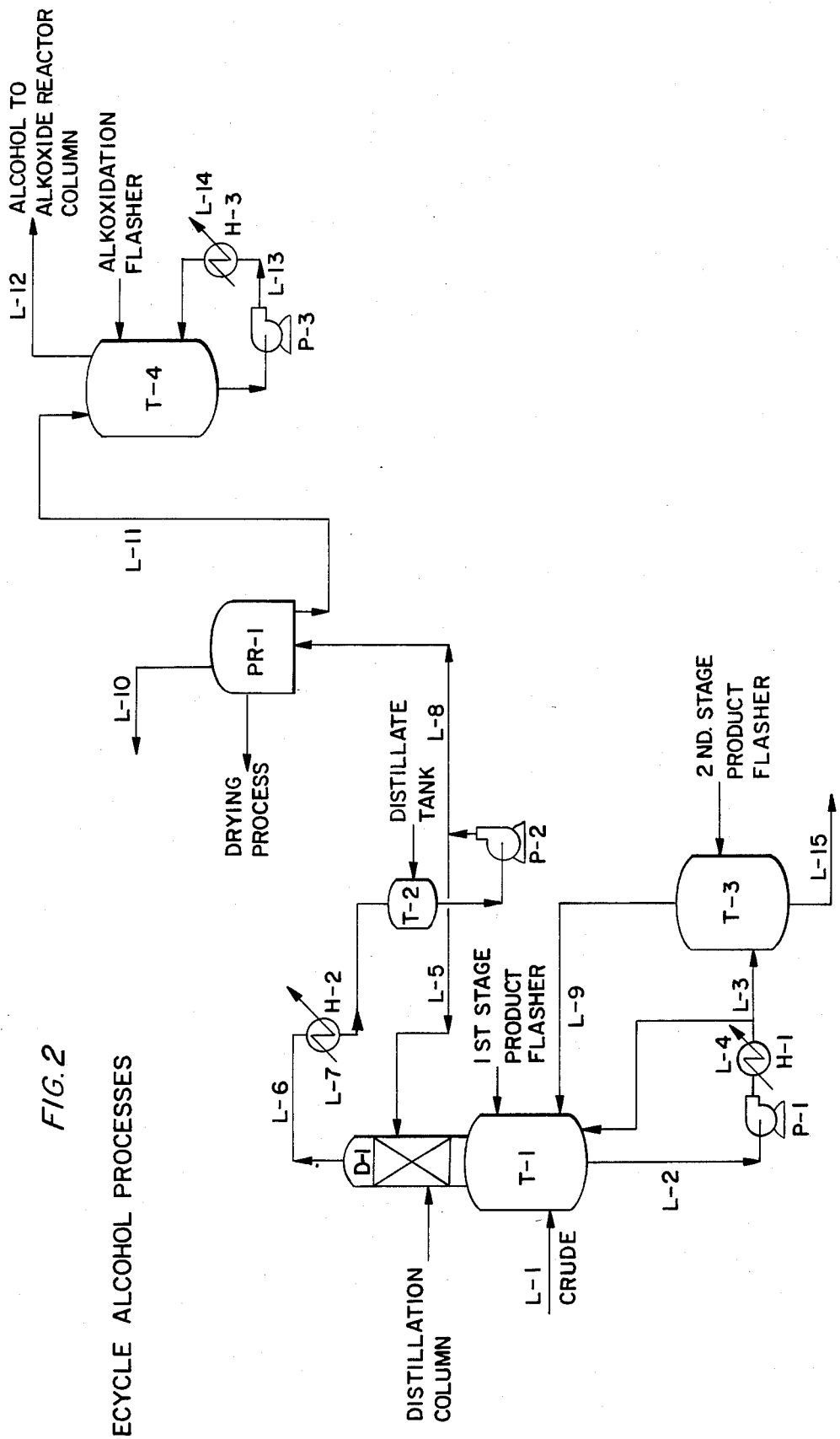

PROCESS FOR PRODUCING AND RECOVERING TRIBUTYL PHOSPHATE ESTERS

This application is a continuation-in-part of U.S. Ser. No. 491,625 filed May 5, 1983 and now abandoned.

This invention relates to an improved process for producing tributyl phosphate esters in which a continuously produced alkoxide product is phosphorylated in a continuous process. Excess alcohol is recovered after the phosphorylation action and returned to the alkoxidation action.

The chemistry for making alkoxides and using these alkoxides in the production of aliphatic phosphate esters is well known. See, for example, U.S. Pat. No. 3,020,303 issued to John A. Pinafetti and John L. Janey. The process was first developed commercially as a batch operation in which an appropriate alcohol was added to a vessel and heated and dried. Caustic was added and the mixture heated for a number of hours. The vapors from the vessel entered a distillation column where water was removed. At the end of the cycle the alkoxide product was removed to a storage tank. The alkoxide product in excess aliphatic alcohol was later phosphorylated to produce the corresponding triorganic phosphate and the excess alcohol recovered, and processed for later use. The synthesis was conducted throughout in a nonoxidizing atmosphere.

The aforesaid batch process for producing tributyl phosphate esters used two flash stills operated sequentially after the phosphorylation reactor to separate the excess alcohol for return to the alkoxide reactor. The first flasher still (flasher) separated alcohol from the product phosphate ester. Relatively small amounts of alcohol remaining in the ester after the first flash distillation were removed overhead in the second flasher still and returned to the first flash still. Overhead material from the first flasher was dried and returned to the alkoxide reactor. The underflow (bottoms) from the second flasher was water washed and dried to produce product having commercially acceptable color.

This batch process was converted to a continuous process. Operation of the continuous process for some time resulted in a noticeable increase in the color of the tributyl phosphate ester produced by the overall continuous process. The continuous alkoxidation reactor was heated by flash distilling the reactant alcohol and introducing the overhead from the still into a column reactor to effect the reaction and drive off water vapor from the top of the column reactor. The reactor bottoms, the alkoxide, were fed to the continuous phosphorylation reactor. There were no bottoms from the alcohol flasher used to heat the alkoxidation reactor. The phosphorylation product was refined using two flashers. The first flasher separated product ester from the excess alcohol and the second flasher removed remaining alcohol from the product phosphate ester. Eventually the ester produced exceeded the typical commercial color specification maximum of 50 platinum cobalt color (ASTM 1209-69).

In accordance with the present invention there is provided a continuous alkoxidation/phosphorylation process for producing aliphatic phosphate esters having commercially acceptable colors in which the alcohol (butanol) from an alcohol flasher which returns recovered alcohol to the continuous alkoxide reactor is modified so that the overhead from the flasher enters a distillation column to effect an increased purification of the recycle alcohol. Surprisingly, byproduct materials removed in the purification cause unacceptable color in the commercial tributyl phosphate.

The breakdown of tributyl phosphate by heat is not a new phenomena. The breakdown products are known to contain color precursors and acidic components. In the batch alkoxidation/phosphorylation process, breakdown of tributylphosphate was expected due to the presence of alkoxide and heat which saponified the tributyl phosphate. In the continuous process alkoxide is not usually present in the alkoxidation section alcohol flasher so color formation due to having product in contact with alkoxide and heat was not expected. The alcohol media in the alkoxidation alcohol flasher would not be expected to alter the breakdown process.

Prior to fitting the alcohol flasher with the distillation column to further treat the overhead from the first flasher high color occurred in the tributyl phosphate when accumulated ester products were processed. Vapor phase chromatographic analysis of the downstream product of the alkoxidation reaction made using recycle alcohol did not reveal either breakdown products or color precursors. It was observed that operation of the alcohol flasher in the alkoxide section of the process accumulated high boiling products which eventually had to be purged from the system as the only exit from the flasher was an overhead vapor exit. Laboratory simulation of purging the accumulated alkoxide unit alcohol flasher bottoms into the downstream process did cause high color. In another laboratory test tributyl phosphate was added to recycle butanol and boiled for 78 hours. No color increase in tributyl phosphate made from this product was observed.

The alkoxide reaction requires excess reactant alcohol to drive the reaction in the desired direction. The excess alcohol is eventually recovered from the phosphate ester product stream and returned to the alkoxide process. The change from batch operation to continuous processing of alkoxide apparently changed the disposition of the contaminants in the recycled alcohol. In the batch process any such contaminants were discharged with the alkoxide at the end of each batch and transported onto the phosphorylation reaction. Any breakdown occurring in the batch processing was apparently insufficient to cause high color in final phosphate ester product. A non-oxidizing atmosphere such as natural gas, methane, carbon dioxide or nitrogen is used in the synthesis with the non-flammable gases being preferred.

The invention will now be described with reference to the figures and the production of tributyl phosphate.

A BRIEF DESCRIPTION OF THE DRAWINGS

FIG. 1 is a block flow diagram for the complete alkyl phosphate ester process.

FIG. 2 entitled Recycle Alcohol Process includes portions of the alkoxide process, drying process and stripping process relevant to the present invention.

DETAILED DESCRIPTION OF THE DRAWING

Figure 1:
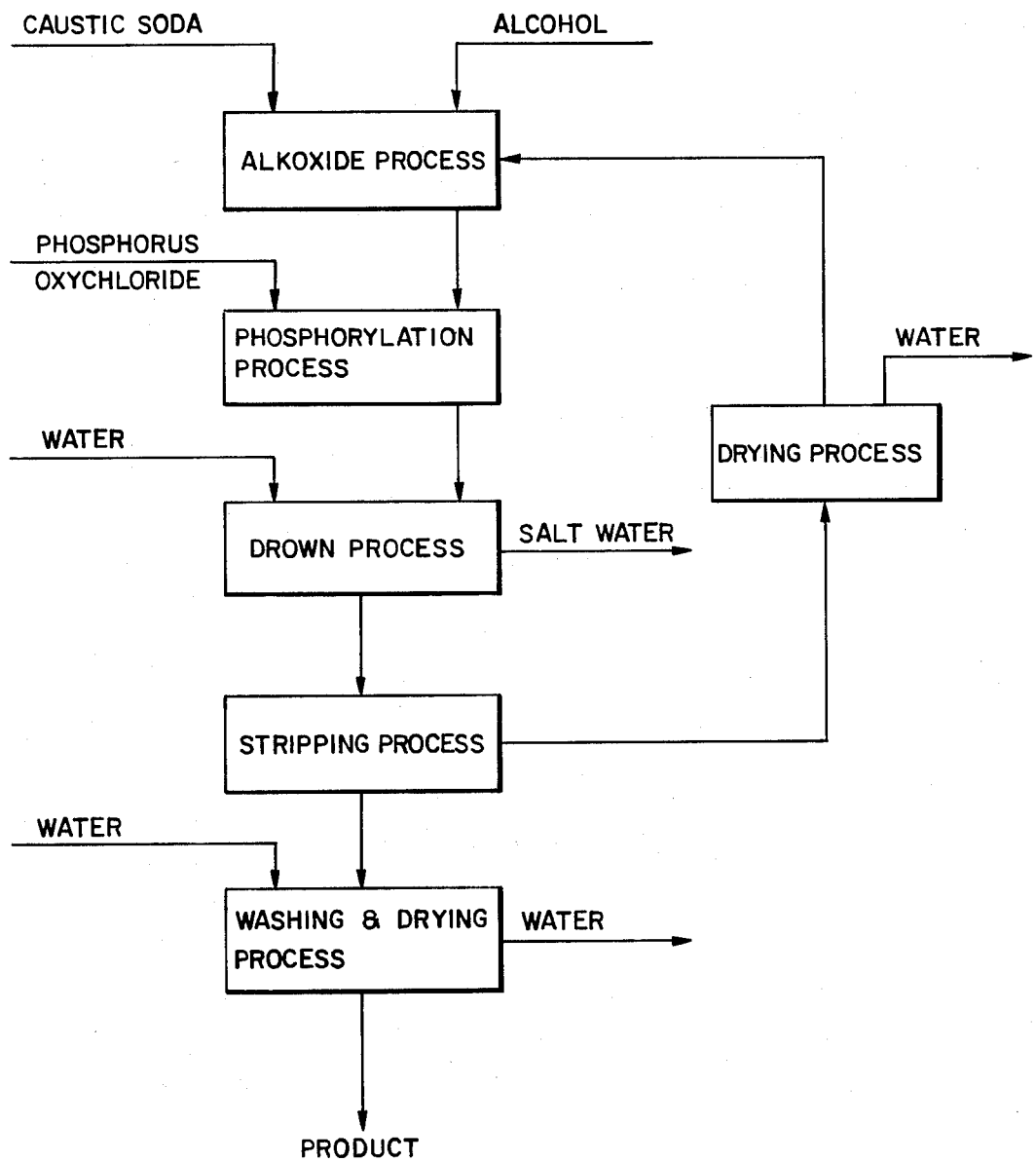

Referring to FIG. 2, the crude phosphate ester, in excess butanol enters the flasher T-1 through line L-1. Vapors from the flasher T-1 enter the distillation column D-1 which is fitted to the top of the flasher. Overhead from D-1 is condensed in water cooled condenser H-2 and the condensed product collected in tank T-2. The butanol condensate is removed from T-2 by pump P-2 and the discharge from P-2 divided into two lines 5 and 8. The alcohol in line 5 is returned to column D-1 and the alcohol in line 8 is dried in the dryer PR-1 and returned to the alkoxidation flasher T-4 for use in the alkoxidation section of the process. The pump P-1 removes the bottoms (underflow) from the flasher T-1 through line L-2 which underflow is fed to the second stage flasher T-3 which further separates butanol from the product tributyl phosphate. The underflow or bottoms from the second flasher T-3 is refined to become the final product.

The following examples further illustrate the process of this invention. A non-oxidizing atmosphere (Nitrogen) was used in the synthesis in alkoxide and phosphorylation processes.

EXAMPLE OF THE INVENTION

Utilizing the continuous process for alkoxidation/phosphorylation described above and with the first flasher after the phosphorylation reaction fitted with a distillation column as described above and shown in the figure, the process was started up and run under several slightly different operating conditions. Flasher (T-1) temperature was 115° C. and the pressure was 126 mm of mercury. The recycled alcohol rate was 18.4 gallons per minute and the distillation column reflux was 2.5 gallons per minute. Under these conditions the column temperature was 58° C. at the top and 80° C. at the bottom. The column overhead (recycled alcohol) analyzed 0.0% TBP. Continuing under slightly different conditions, the flasher temperature was maintained at 116° C. and a pressure of 97 mm of mercury. Recycled alcohol was 12.3 gallons per minute and the column reflux alcohol was 2.5 gallons per minute. The column temperature at the top was 58° C. and at the bottom 80° C. and the column overhead was found to contain 0.0% TBP. Over the period in which the operation was conducted 1,140 lbs. of tributyl phosphate and other contaminants were collected from the flasher in the alkoxidation section of the plant.

Analytical accuracy is critical at low level concentrations. As can be seen from the amount of tributyl phosphate ester collected and removed from the flasher, some tributyl phosphate was going overhead. For this series of process runs the amount of tributyl phosphate returned with the butanol and accumulated in the alkoxidation section of the process was calculated to be 0.15%.

Tributyl phosphate final product had a platinum-cobalt color of less than 25.

COMPARATIVE EXAMPLE

In a similar time period during which the continuous process was operated manufacturing tributyl phosphate but in which the distillation column fitted to the top of the first flasher was not in existence, the analysis of the flasher overhead contained 0.75% tributyl phosphate and during the run 10,860 lbs. of tributyl phosphate was collected from the flasher in the alkoxidation section. The tributyl phosphate final product had a platinum-cobalt color greater than 200.

Thus, the continuous operation of the Pianfetti process, U.S. Pat No. 3,020,303, was accompanied by a rapid increase in color of the phosphate ester to unacceptable color levels. An attempt to reduce color by use of the additional distillation column did not remove color from colored phosphate ester. That is if the crude product entering the stripping process was colored additional distillation to better separate alcohol from phosphate ester did not remove the color from the phosphate ester product. Suprisingly when the equipment was emptied and the process operated under similar conditions with a fresh supply of alcohol the rate of color buildup in the phosphate ester was greatly reduced.

The additional separation stage (distillation column) can be operated under varying conditions determined in part by column size and available reduced pressure sources. When operating as outlined above the recycle alcohol can be refluxed at rates of about 0.5 to 2.5 gallons per minute (gpm). The lower range of reflux, 0.5 to 1.0 gpm, is preferred since higher reflux rates increase the amount of heat required for the overall separation thus increasing cost; more heat increases the possibility of product breakdown during separation of excess alcohol from the tributyl phosphate. Lower pressures approaching 0 are also beneficial as lower operating temperatures are possible. Operating above 200 mmHg is not desirable due to higher operating temperatures.

What is claimed is:

1. In a continuous alkoxidation-phosphorylation process for producing tributyl phosphate having low color utilizing excess butanol in which the continuous alkoxidation reaction is heated by flash distilling the butanol and introducing the overhead from such alkoxidation flash still into the alkoxidation reactor to heat the reaction and drive off water overhead, feeding the alkoxidation reactor bottoms, the alkoxide in excess butanol, to a continuous phosphorylation reactor and after phosphorylation recovering the excess butanol from the phosphorylation reaction mixture by two stage flash distillation, the bottoms tributyl phosphate product from the first stage butanol recovery flash still going to the second stage butanol recovery flash still, the butanol overhead product from the second stage returning to the first stage flash distillation, and the bottoms, tributyl phosphate product, from the second stage distillation going to a final product washing and drying process while the overhead butanol from the first stage flash distillation is fed to the process alkoxidation alcohol flash still, the improvement which comprises distilling in a distillation column the butanol overhead from the first stage flash distillation and then feeding the butanol overhead from the distillation column to the alkoxidation alcohol flash still.

2. The process of claim 1 in which the distillation column is a packed column.

3. The process of claim 2 in which the packed distillation column is operated at an absolute pressure greater than 0 and less than the 200 mm of mercury.

* * * * *